United States Patent [19]
Kidder et al.

[11] Patent Number: 5,822,599
[45] Date of Patent: *Oct. 13, 1998

[54] METHOD AND APPARATUS FOR SELECTIVELY ACTIVATING A COMPUTER DISPLAY FOR POWER MANAGEMENT

[75] Inventors: Jeff Kidder, Hillsboro; Robert Adams, Lake Oswego, both of Oreg.

[73] Assignee: Intel Corporation, Santa Clara, Calif.

[ * ] Notice: The term of this patent shall not extend beyond the expiration date of Pat. No. 5,598,565.

[21] Appl. No.: 768,042

[22] Filed: Dec. 17, 1996

[51] Int. Cl.⁶ .............................. G06F 1/30; G09G 1/00
[52] U.S. Cl. .............................. 395/750.06; 395/750.03; 345/212; 345/214
[58] Field of Search ................. 395/750.01, 750.03, 395/750.05, 750.06, 750.08; 364/707; 345/211, 214; 315/386

[56] References Cited

U.S. PATENT DOCUMENTS

| | | | |
|---|---|---|---|
| 5,210,472 | 5/1993 | Casper et al. | 315/349 |
| 5,375,245 | 12/1994 | Solhjell et al. | 395/750.03 |
| 5,459,833 | 10/1995 | Nishizawa | 345/508 |
| 5,465,366 | 11/1995 | Heineman | 395/750.06 |
| 5,598,565 | 1/1997 | Reinhardt | 395/750.05 |
| 5,680,563 | 10/1997 | Edelman | 345/348 |
| 5,691,745 | 11/1997 | Mital | 345/148 |

*Primary Examiner*—Gopal C. Ray

[57] ABSTRACT

A method and apparatus for exclusively activating pixels in an active area of a computer display when a computer system is operating in a power management mode. In one embodiment, the pixels within the active area of the display are exclusively activated by providing less power to the pixels outside of the active area of the display.

15 Claims, 3 Drawing Sheets

METHOD AND APPARATUS FOR SELECTIVELY ACTIVATING A COMPUTER DISPLAY FOR POWER MANAGEMENT

FIELD OF THE INVENTION

The present invention relates to computer systems, and, in particular to a method and apparatus for selectively activating a computer display to reduce power consumption.

BACKGROUND OF THE INVENTION

Today, portable computers and laptop computers are providing computer operators with the flexibility to operate computers independent of fixed power sources, such as electric outlets. The portable computers are able to operate on power provided from an alternative limited power source, which is usually affixed to the computer. For example, most portable computers are able to operate using a battery.

When consuming power from an alternative power source that is limited, most portable computers switch into a power management mode to conserve the limited power source. That is, when operating in a power management mode, a portable computer typically attempts to consume the minimum amount of power necessary to provide basic operating functions.

One of the main power consumers in portable computers is the computer's display, which provides the visual output of a computer. Although typically only a certain area of the computer's display is being updated at any given time, usually the entire computer display is activated (i.e., receiving power). Therefore, the computer's display unnecessarily consumes more power than is necessary.

Therefore, it can be appreciated that there is a need for selectively activating a computer display when operating in a power management mode to conserve power.

SUMMARY OF THE INVENTION

The present invention provides a method and apparatus for exclusively activating pixels in an active area of a computer display when a computer system is operating in a power management mode. In one embodiment, the pixels within the active area of the display are exclusively activated by providing less power to the pixels outside of the active area of the display. As a result, the present invention allows a computer to consume less power to display information, which is considered to be advantageous when the computer system is receiving power from an alternative power source, such as a battery.

BRIEF DESCRIPTION OF THE DRAWINGS

The present invention is illustrated by way of example and not limitation in the figures of the accompanying drawings and, in which.

DETAILED DESCRIPTION

The present invention provides a method and apparatus for selectively activating a computer display for power management.

Figure 1:
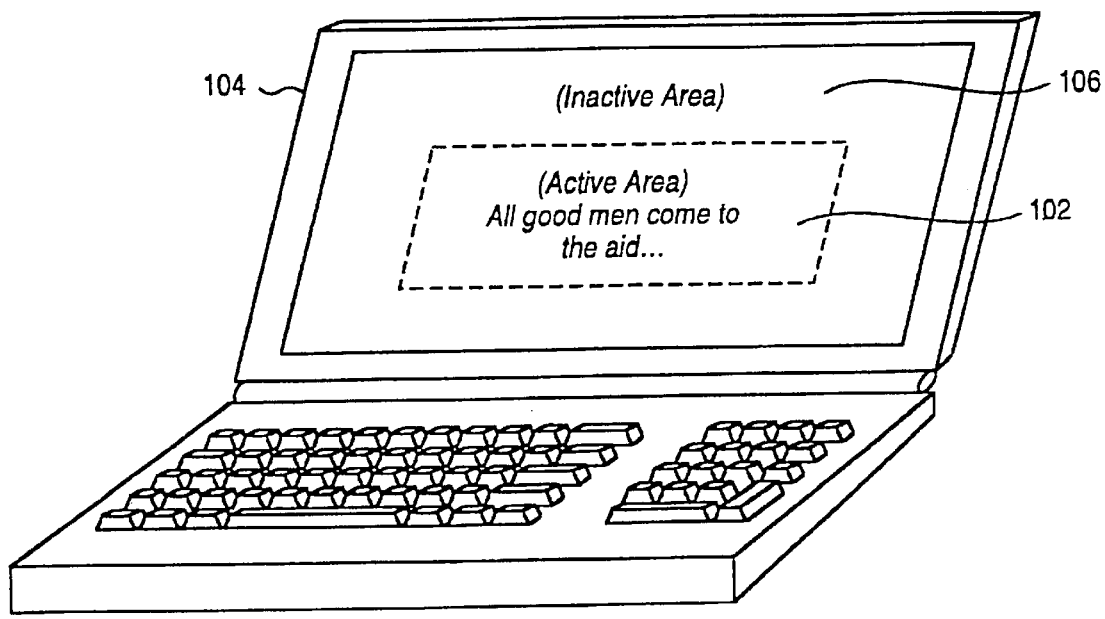
FIG. 1 illustrates a selectively activated display of a portable computer according to one embodiment of the present invention.

As illustrated in FIG. 1, the present invention reduces the amount of power consumed to illuminate a computer display by only providing power to an active area 102 of the display 104, or alternatively, providing less power to inactive areas 106 of the display 104. As a result, only the active area 102 of the computer display is illuminated. Alternatively, the active area 102 of the display 104 is displayed brighter than the inactive areas 106. As defined herein, an "active area" of the display is a discrete area of a computer display that is of current interest to a computer operator (e.g. currently being updated.)

Figure 2:
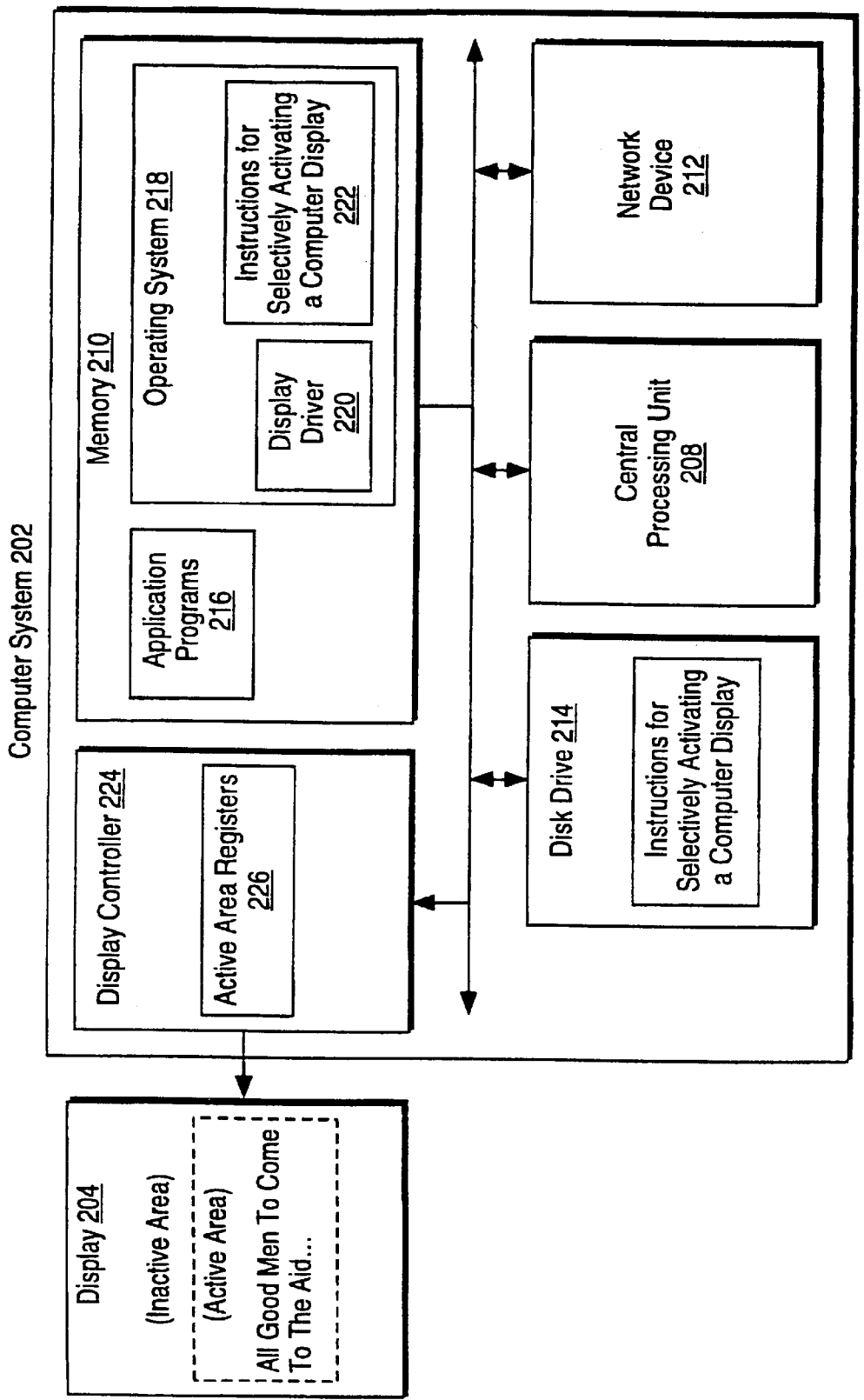
FIG. 2 illustrates an exemplary computer system configured to selectively activate a computer display according to one embodiment of the present invention.

FIG. 2 illustrates one embodiment of a computer system 202 configured to selectively activate a computer display 204 for power management. As shown, the computer system 204 includes a central processing unit 208 for executing instructions, a memory device 210 for storing data and instructions, a network device 212 for transferring data with separate computer systems interconnected over a network, and a disk drive 214 for accessing data and instructions from machine readable mediums.

As shown in FIG. 2, the memory device includes an application program 216 which is developed to have the computer system perform a specific function. The application program is executed with the design that its results and activities are displayed on the computer display, even though the application is typically not responsible within the computer system for actually mapping its activities and results onto the computer display.

The operating system 218 of the computer system, also shown in the memory, is typically responsible for controlling the allocation and usage of the computer system's resources. In particular, the operating system is responsible for mapping an application program's activities and results onto the computer's display. That is, the operating system responds to the execution of the application program and displays the program's activities and results when necessary. For example, during execution of the application program, the results of certain instructions or activities are to be displayed on the computer display (e.g., typing the letter 'A'), while other operations do not need to be displayed (e.g., performing memory accesses).

In addition, the operating system typically maintains a logical representation of what information and where the information is currently being displayed on computer display. This information may be stored in an area of the memory device. As a result, in response to execution of the application program or other activities occurring in the computer system, the operating system can determine where new data should be placed on the computer display, and when and where data should be modified on the computer display.

In one embodiment, the operating system includes a display driver 220, which it uses to update the computer display. The display driver typically consist of a group of procedures and routines that generate digital signals that are sent to a display controller 224, which in turn converts the signals into electrical charges that are provided to the display to update the display.

More specifically, computer displays typically consist of columns and rows of picture elements ("pixels"). An electrical charge is provided to each separate pixel to display the respective pixel. If a pixel does not receive an electrical charge the pixel is not displayed on the computer display. Based on the digital signals sent from the display driver of the operating system, the display controller is able to determine which pixels of the display are to receive an electrical charge.

In one embodiment of the present invention, the operating system includes additional procedures and routines that allow the computer system to operate in a power management mode. These additional procedures and routines are shown in the memory of FIG. 1 as the "Instructions for Selectively Activating A Computer Display 222".

When operating in a power management mode, the operating system determines the active area of the computer display. That is, the area of the computer display that should be activated (i.e., receive an electrical charge) to effectively display the current activities of an application being executed. The size of a display area that is considered necessary to effectively display an applications current activities can vary within the scope of the invention, considering such factors as the type of application being executed, the computer operator's indicated preference, or the amount of power consumption that is sought to be reduced.

Once the active area is determined, the dimensions of the activities are stored in a set of active area registers 226 in the display controller. In alternative embodiments, the dimensions of the active area can be stored in other memory devices within the display controller or outside of the display controller (e.g., memory buffer).

Thereafter, only the active area of the display, as defined by the dimensions stored in the active area registers, are able to be activated to display information on the computer display. That is, areas of the display outside of the active area are not activated and therefore do not draw power (or alternatively draw a considerable less amount of power).

Figure 3:
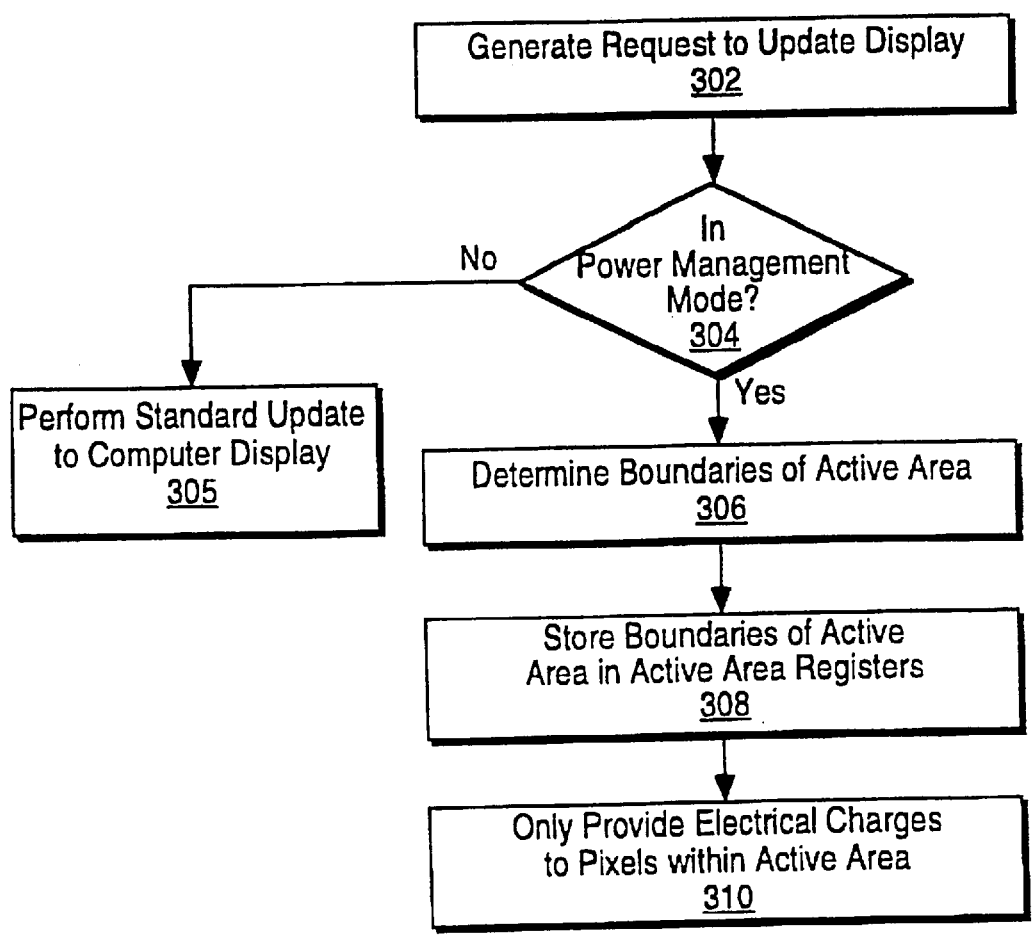
FIG. 3 illustrates a flow diagram describing the steps of selectively activating a computer display according to one embodiment of the present invention.

The method of performing the steps of the present invention are further described in the flow diagram shown in FIG. 3. In step 302, execution of an application program generates an update to the information currently being displayed on the computer display. The update could be in response to data input received by the computer system, execution of an instruction, or alternatively, a system interrupt.

In step 304, the operating system responds by determining whether the computer system is in a power management mode, wherein the computer system is attempting to reduce the amount of power needed to perform basic computing functions. In one embodiment, the operation mode status could be stored in an addressable memory location, where it could be easily accessed by the operating system. The operation mode could be set manually by the operator of the computer system when the computer system begins to consume power from a battery source, or some other alternative power source. Alternatively, the computer system or operating system could be configured to automatically switch into the power management mode in response to the computer system consuming power from an alternative power source.

If the computer system is currently not in a power management mode, in step 305 the operating system will proceed to display images and data on the computer display using conventional techniques. On the other hand, if the computer system is currently in a power management mode, in step 306 the operating system determines the dimensions of the current active area displayed on the computer display. In one embodiment, the boundaries of the active area are defined by rows and columns of pixels displayed on the computer's display. Several factors can be taken into consideration when determining the boundaries of an active area. For example, the boundaries of the active area may be based on such factors as: the type of application program currently being executed (e.g. word processing, spread sheet, graphics illustrator); the activities currently being executed by the application program; or, preferences submitted by an operator of the computer system.

For example, if the computer system is in a power management mode when executing a word processing application, the operating system of the present invention may be configured to display the line of text currently being updated, and one line of text above and below the line of text being updated. In a second example, if a spread sheet application is being executed, the present invention may be configured to only display the column or row of the spread sheet application presently being utilized.

In alternative embodiments, however, the present invention can selectively activate the computer display independent of an application program. For example, the present invention could determine the boundaries of an active area when an application program is not being executed. In that case, the active area could be based on the current activities of the operation system or other activities occurring in the computer system. In addition, the operating system may alternatively be configured to determine the boundaries of the computer display's active area in response to switching into the power management mode, before an update to the display is requested.

Once the boundaries of the active area have been determined, in step 308 the boundaries of the current active area are stored in the active area registers of the display controller. In step 310, the display controller only provides electrical charges to the active area of the display as currently defined by the active area registers. In an alternative embodiment, electrical charges provided to the area of the display outside active area are less than the charges provided to the active area.

In one embodiment, to have the display controller only provide electrical charges to the pixels located in the active area, the operating system also provides a signal to a logic unit of the display controller, which indicates that the computer system is currently in power management mode. In response to the signal, the logic unit of the display controller will provide an enable signal to the active area registers. The enable signal enables the active area as currently defined in the active area registers to limit electrical charges to the pixels within the active area.

In alternative embodiments, comparable circuit configurations can be implemented to selectively provide power to the active area of the computer display without departing from the present invention. For example, the boundaries of the current active area could be stored in memory and the operating system could be configured to only send signals to the display controller which indicates the pixels that are to be activated.

Moreover, a display buffer could also be provided, in which the values of the pixels to be displayed are included, and the inactive pixels have a flag set or a special value which denotes them as such. In another embodiment, a complete display buffer could be maintained as well as the boundaries of the active area. A video driver could cycle through the active area boundaries refreshing the display. Any pixels which are not in the active area would then not be activated and would be in a lower power state.

To maintain an accurate active area, the operating system of the present invention determines if subsequent updates to the display are within the current active area. If an update is to be made within the current active area, no modification to the boundaries of the active area are necessary. If an update is outside of the current active area, the boundaries of the current active area may need to be modified.

In one embodiment, the extent of the modification may depend on the type of update. For example, if the update consists of a user dragging a cursor to the bottom of the display to scroll down a document currently being viewed, the present invention could be configured to not expand the active area and merely display the document scrolling within the active area. In contrast, the operating system may respond by activating the entire computer display.

In a second example, a system interrupt may occur which causes an update to a local area of the display outside of the current active area (e.g., an e-mail update which activates an e-mail prompt). The present invention may be configured to respond by designating the local area outside of the active area as an additional active area and providing electrical charges to that local area in addition to the current active area. Alternatively, the present invention may be configured to respond by activating the entire display.

In an alternative embodiment, the manner in which the present invention responds to updates outside of the current active area may further depend on the computer operator's indicated preference. For example, prior to generating the boundaries of the active area, the operating system of the present invention may provide a user with a decision menu, which prompts the user to determine how the operating system should respond to display updates outside the current active area.

The instructions for Selectively Activating A Computer Display 222 shown stored in the memory, can also be stored on other computer-readable mediums, such as floppy disks, optial disks, CD-ROMs, and magneto-optical disks, ROMs, RAMs, EPROMs, EEPROMs, magnet or optical cards, or any type of media suitable for storing electronic instructions, which could be accessed via a disk drive such as the one shown in FIG. 1. Moreover the logic of the instructions for Selectively Activating A Computer Display could also be implemented in hardware components without departing from the scope of the present invention.

What is claimed is:

1. A computer system comprising:

a display; and a first device configured to exclusively activate pixels in an active area of said display as determined by an operating system of said computer system, said first device configured to automatically exclusively activate pixels in an active area of said display in response to said computer system receiving power from an alternative power source.

2. The computer system of claim 1 wherein less power is provided to an area outside said active area of said display.

3. The computer system of claim 2 wherein said first device is configured to be operable in a plurality of modes, said first device configured to exclusively activate pixels in said active area of said display when said first device is operating in a power management mode.

4. The computer system of claim 3 wherein said first device is configured to expand said active area of said display in response to an area outside said active area being updated.

5. The computer system of claim 3 wherein said first device is configured to activate a local area outside said active area in response to said local area being updated.

6. A computer-implemented method comprising the steps of:

switching into a power management mode; and exclusively activating pixels in an active area of a computer display as determined by an operating system, said exclusively activating pixels is performed automatically in response to a computer system receiving power from an alternative power source.

7. The computer-implemented method of claim 6 wherein the step of exclusively activating pixels includes providing less power to an area outside said active area of said display.

8. The computer-implemented method of claim 7 the step of exclusively activating pixels in said active area of said computer display is performed in response to the step of switching into a power management mode.

9. The computer-implemented method of claim 8, further including the step of expanding said active area of said display in response to an area outside said active area being updated.

10. The computer-implemented method of claim 9 further including the step of activating a local area outside said active area in response to said local area being updated.

11. A computer-readable medium having stored thereon a plurality of instruction including a first set of instruction, said first set of instruction when executed by a processor, cause said processor to perform the steps comprising of:

switching into a power management mode; and exclusively activating pixels in an active area of a computer display as determined by an operating system of a computer system, said exclusively activating pixels is performed automatically in response to said computer system receiving power from an alternative power source.

12. The computer-readable medium of claim 11 wherein the step of exclusively activating pixels includes providing less power to an area outside said active area of said display.

13. The computer-readable medium of claim 12, wherein the step of exclusively activating pixels in said active area of said computer display is performed in response to the step of switching into a power management mode.

14. The computer-readable medium of claim 13, wherein said first set of instructions further include additional instructions, when executed by said processor, cause said processor to perform the step of expanding said active area of said display in response to an area outside said active area being updated.

15. The computer-readable medium of claim 13, wherein said first set of instructions further include additional instructions, which when executed by said processor, cause said processor to perform the step of activating a local area outside said active area in response to said local area being updated.

\* \* \* \* \*